(12) United States Patent
Shimada

(10) Patent No.: US 6,589,601 B1
(45) Date of Patent: Jul. 8, 2003

(54) APPLICATION METHOD OF SEALING AGENT

(75) Inventor: Takaji Shimada, Kawaguchi (JP)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 09/959,225
(22) PCT Filed: Apr. 21, 2000
(86) PCT No.: PCT/JP00/02634
§ 371 (c)(1), (2), (4) Date: Jan. 2, 2002
(87) PCT Pub. No.: WO00/65630
PCT Pub. Date: Nov. 2, 2000

(30) Foreign Application Priority Data

Apr. 23, 1999 (JP) .......................................... 11-155594

(51) Int. Cl.⁷ .............................. B05D 3/12; B05D 5/12; B05D 1/36
(52) U.S. Cl. ...................... 427/348; 427/58; 427/419.2; 427/230
(58) Field of Search ................................ 427/419.2, 58, 427/230, 348

(56) References Cited

U.S. PATENT DOCUMENTS

| 3,711,733 A | * | 1/1973 | Skutt ............................ 313/518 |
| 4,519,974 A | | 5/1985 | Bravenec et al. ............ 264/279 |
| 4,786,060 A | | 11/1988 | Davis .............................. 277/1 |
| 4,954,059 A | | 9/1990 | Lee et al. .................... 425/72.1 |
| 5,114,752 A | | 5/1992 | Hall ............................ 427/273 |
| 5,800,614 A | | 9/1998 | Foust .......................... 118/315 |
| 6,254,939 B1 | * | 7/2001 | Cowan et al. ............... 427/510 |

FOREIGN PATENT DOCUMENTS

GB    1299598    12/1972

* cited by examiner

Primary Examiner—Michael Barr
(74) Attorney, Agent, or Firm—Wood, Herron & Evans, L.L.P.

(57) ABSTRACT

In the process for producing a laminated substrate (1) such as electronic substrates (2; 3), when applying a sealing agent (7) to the end face of substrates (2; 3) combined together to seal it, first the sealing agent (7) is applied to a target area in the form of successive beads (7), and then a stream of compressed gas (10) is blown against the successive beads (7) from a gas ejecting nozzle (9) so as to scan the successive beads (7). The method can effectively fill the indentation or the stepped area formed along the end face with the sealing agent (7).

5 Claims, 2 Drawing Sheets

APPLICATION METHOD OF SEALING AGENT

TECHNICAL FIELD

This invention relates to a method of applying a sealing agent (or sealant) for the purposes of insulation and moistureproofing in the process of manufacturing electronic substrates. More particularly, the present invention relates to a method of applying a sealing agent adapted to seal the end face of the glass substrates of a plasma display to be put together.

U.S. Pat. No. 5,800,614 discloses a device for applying adhesive to platens of a textile screen printing machine as the platens move from the unload stage to the load stage. The device comprises a frame mountable to the screen printing machine so that it extends over the moving platens, at least one interconnectable housing carried by the frame. Each housing has an array of adhesive-depositing nozzles and adhesive-spreading air nozzles plus a drying nozzle. As a platen passes under the housings, a sensor initiates the array of adhesive nozzles to deposit columns of adhesive onto the platens. Then the air nozzles spread the columns of adhesive by blowing air onto the columns. Finally, the spread adhesive is dried by gas from the drying nozzle, preferably directing a single curtain of air under pressure onto the adhesive.

U.S. Pat. No. 5,114,752 discloses a method for depositing liquid material onto a workpiece in the form of a deposit having a desired conformation wherein the material is discharged under pressure from the nozzle of a dispensing gun which can be manipulated by a robot to lay the deposit according to a programmed pattern on the workpiece. One or more gas jets are directed toward the material after the material is discharged from the nozzle to impart a desired conformation to the material deposited on the workpiece. The flow rate of the gas jets is controlled in accordance with liquid flow rate to maintain substantial uniformity of the conformation of the deposit.

U.S. Pat. No. 4,786,060 describes a method for applying liquid sealant in holes of a structural member prior to installing fasteners in such holes, which compromises mixing air with a liquid sealant, spraying a controlled amount of the resulting air-sealant mixture into the holes and depositing liquid sealant therein, and impinging an elevated pressure air stream on the deposited liquid sealant to spread the sealant out and produce a thin layer of sealant in the holes.

GB-1 299 598 describes a method of making a hard brittle rod of resin. A resin is extruded under low pressure through a series of nozzles producing rods of molten resin. These rods are fed on to a moving conveyor belt and passed under the series of sprays from a sprayer which quickly cools the resin by means of a cooling medium which is normally water. The rod is then subjected to a jet or blast of air, preferably hot air from a blower, to remove service moisture.

A known method of the above identified category will be described by way of the process of manufacturing a plasma display. A plasma display is adapted to generate ultraviolet rays by means of electric discharge in gas between a pair of electrodes, irradiating a fluorescent member thereof with the generated ultraviolet rays to generate visible light. The plasma display typically has a sandwich-like layered structure in which various kinds of functional thin films are formed between a front glass and a rear glass, including electrode films, a fluorescent film and ribs for holding the fluorescent film. After bonding lead wires to the electrodes for electric energization, the end face of the combined glass substrates are sealed by means of a sealing agent mainly for the purposes of insulation and moistureproofing.

That structure is outlined in FIG. 2. FIG. 2 is a schematic perspective view showing the portion of a plasma display where a sealing agent is applied and FIG. 3 is a schematic cross sectional view of the portion of a plasma display where the sealing agent is applied. In FIGS. 2 and 3, the plasma display 1 comprises a front glass 2, a rear glass 3 and various kinds of functional thin films 4 arranged between the glass plates, including electrode films, a fluorescent film and ribs for holding the fluorescent film. Thus, the plasma display 1 has a layered structure like that of a sandwich. Reference numeral 5 in FIGS. 2 and 3 denotes a drive substrate for driving the plasma display 1. A large number of thin lead wires 6 are arranged in a film state to connect the drive substrate 5 and the electrodes formed in the functional films 4 of the plasma display 1.

It should be noted that the front glass 2 is dimensionally smaller than the rear glass 3 while the functional films 4 are dimensionally smaller than the front glass 2. After bonding the lead wires 6 to the electrodes of the plasma display 1, a sealing agent 7 is applied to the entire end face of the front glass 2 and the functional films 4 laid on the rear glass 3, including the connecting area of the lead wires 6, in order to seal the plasma display for the purposes of insulation and moistureproofing. Accordingly, as clearly seen in FIG. 2, the shape of the portion to which the sealing agent 7 is applied has an indentation formed between the front glass 2 and the rear glass 3. Referring to FIG. 3, the functional films 4 have a total thickness a that is between 100 and 400 $\mu$m and the front glass 2 projects from the functional films 4 by a distance b that is between 500 and 3,000 $\mu$m. Thus, the indentation is defined by the thickness a and the distance b.

The aforementioned known method has a drawback as described below. When manufacturing plasma displays of the above described type, there often occur occasions where the indentation ends up without being filled with the applied sealing agent 7 to leave a void (denoted by c in FIG. 3) because the end face of the functional films 4 is located inside that of the front glass 2 on manufacturing considerations.

The sealing agent 7 is typically of the silicon type or of the epoxy type that can be set by ultraviolet rays or heat and shows a viscosity between 100 and 1,000 poise/20 C. When the sealing agent is applied by using an application nozzle directed perpendicularly to the substrate to produce continuous beads of the agent, the indentation may cause a void. While this problem may be avoided by using a low viscosity sealing agent obtained by dissolving the agent into solvent, the gas produced as a result of evaporation of the solvent can contaminate the environment to give rise to a pollution problem. Therefore, there is a demand for the improvement in the sealing.

DISCLOSURE OF THE INVENTION

In view of the above problems, it is therefore the object of the present invention to provide a method of applying a sealing agent to the end face of a laminated substrate such as electronic substrates, in which the indentation or the stepped area formed along the end face can effectively be filled with the sealing agent, i.e., the sealing agent can be improved in throwing power or entering properties.

According to the present invention, the above mentioned object is achieved by a method of applying a sealing agent to a target region, which comprises the steps of: first applying the sealing agent to the target area in the form of successive beads; and then causing a stream of compressed gas from a gas ejecting nozzle to impinge upon said successive beads of the sealing agent as applied, while scanning said successive beads of the sealing agent with said gas ejecting nozzle; the sealing agent is applied to the end face of a substrate, in which an indentation or stepped area is formed along the end face; and the beads of the sealing agent are crushed under the pressure of the gas and spread over the face so that the sealing agent is filled into the indentation or stepped area along the end face.

Thus according to the invention, a sealing agent is applied to a target region in the form of successive beads, and then a stream of compressed gas is blown out of a gas ejecting nozzle while scanning the beads as applied, thereby crushing the beads of the sealing agent and spreading over the face so as to effectively fill the indentation or the stepped area formed along the end face.

PREFERRED MODES FOR CARRYING OUT THE INVENTION

Figure 1A:
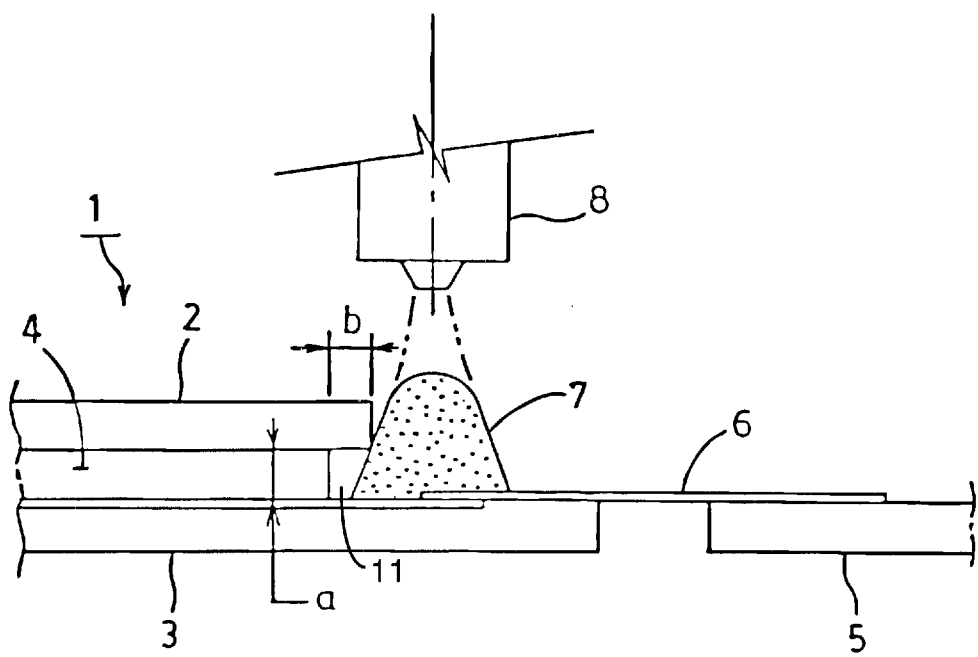
FIGS. 1A and 1B are schematic illustrations of the method of applying a sealing agent according to the invention used in an example.
Figure 1B:
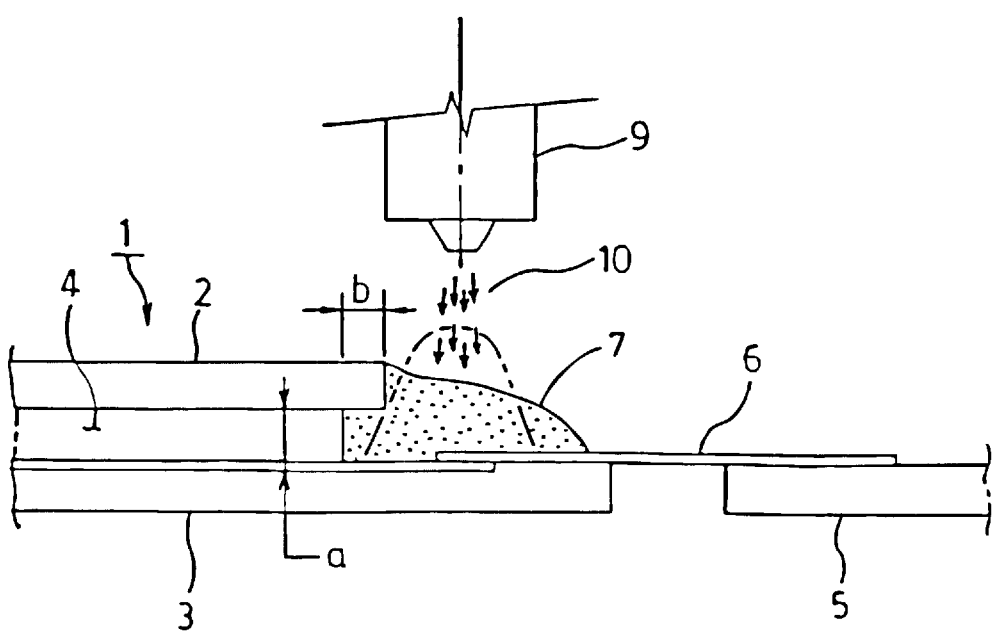
Figure 2:
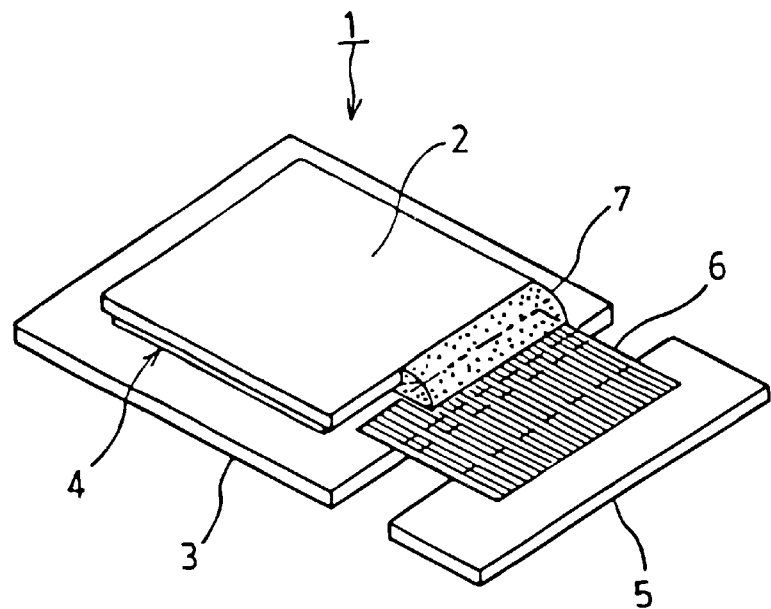
FIG. 2 is a schematic perspective view of the portion of a plasma display to which a sealing agent has been applied by the method according to the invention.
Figure 3:
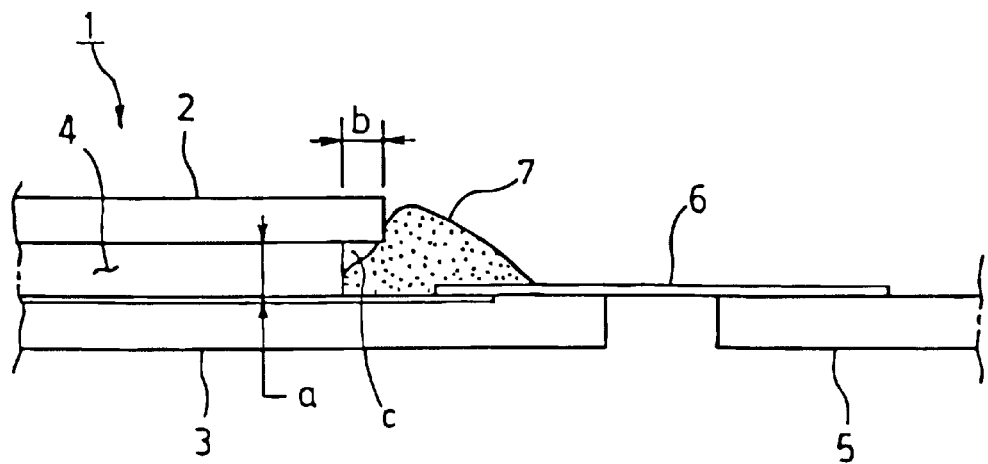
FIG. 3 is a schematic cross sectional view of the portion of a plasma display to which a sealing agent has been applied by prior art.

The method of applying a sealing agent according to the invention will be described in greater detail by way of an example using the accompanying drawings. The present invention is described in terms of a plasma display comprising glass substrates that are put together and sealed at the end face thereof as illustrated in FIG. 2 and described above with a known method. FIGS. 1A and 1B schematically illustrate the method of applying a sealing agent according to the invention in the process of manufacturing a plasma display. The same components as in FIGS. 2 and 3 are denoted by the same reference numerals. FIG. 1A is a schematic illustration of the sealing agent applied in the form of beads and FIG. 1B is a schematic illustration of the sealing agent to which compressed gas is being blown from a gas ejecting nozzle.

Referring to the drawings, the plasma display 1 comprises a front glass 2, a rear glass 3 and various kinds of functional thin films 4 arranged between the glass plates, including electrode films, a fluorescent film and ribs for holding the fluorescent film. Thus, the plasma display 1 has a layered structure like that of a sandwich. Reference numeral 5 denotes a drive substrate for driving the plasma display 1. A large number of thin lead wires 6 are arranged in a film to connect the drive substrate 5 and the electrodes formed in the functional films 4 of the plasma display 1.

The front glass 2 is dimensionally smaller than the rear glass 3 while the functional films 4 are dimensionally smaller than the front glass 2. After bonding the lead wires 6 to the electrodes of the plasma display 1, a sealing agent 7 is applied to the entire end face of the front glass 2 and the functional films 4 laid on the rear glass 3, including the connecting area of the lead wires 6, in order to seal the plasma display for the purposes of insulation and moisture-proofing. Accordingly, as clearly seen in the drawings, the shape of the portion to which the sealing agent 7 is applied has an indentation or gap 11 (FIG. 1A) formed between the front glass 2 and the rear glass 3. Referring to FIG. 3, the functional films 4 have a total thickness of from 100 to 400 $\mu$m and the front glass 2 projects from the functional films 4 by a distance b of from 500 to 3,000 $\mu$m. Thus, the indentation is defined by the thickness a and the distance b.

Thus, firstly, the sealing agent 7 is ejected from a sealing agent ejecting nozzle 8 onto the zone to be sealed to form successive beads of the sealing agent as shown in FIG. 1A, and then, as shown in FIG. 1B, compressed gas 10 is blown out of a gas ejecting nozzle 9 onto the applied sealing agent 7 so as to scan it. As a result, the beads of the sealing agent are crushed under the pressure of the gas and spread over the face so that the sealing agent is sufficiently charged into the indentation or the stepped area produced along the end facets.

The experiments conducted in the example will be discussed below.

1. the indentation of the applied area as defined by the thickness a of the functional films and the gap b
   thickness a of functional films: 100–400 $\mu$m
   gap b: 500–3,000 $\mu$m
2. the sealing agent
   sealing agent: silicon type adapted to be set by ultraviolet rays or epoxy type adapted to be set by heat
   viscosity: 100–1,000 poise/20 C. (solventless type)
   beads of sealing agent: 0.5–3.0 mm (width)×0.5–5.0 mm (height)
3. the gas blow distance between gas jet nozzle front end and sealing agent-carrying
   substrate surface: 5–25 mm
   gas pressure: 0,981–2,943 bar
   gas flow rate: 50–900 liter/min.
   moving speed of gas jet nozzle: 100–1,000 mm/sec.

Compressed gas (air) was blown against the beads of the applied sealing agents under the above conditions of scanning and spread the beads of the sealing agents.

A number of experiments were carried out under the above conditions to find that the indentation was always filled with the sealing agent. There is known a swirl application technique of applying a sealing agent that is designed to produce beads broader than those produced by a popular linear one-pass application technique. Satisfactory results were obtained also in the experiments where the swirl application technique was used to produce broad beads to which compressed gas was blown.

INDUSTRIAL APPLICABILITY

While the present invention is described above in terms of a method of applying a sealing agent to the end face of the glass substrate of a plasma display that are put together in order to seal the end face, the present invention is by no means limited thereto and it can be used for various objects having an indentation or a stepped area along the edges thereof to which a sealing agent should be applied.

As described above, according to the present invention, there is provided a method of applying a sealing agent to the end face of laminated substrates that are laid one on the other such as electronic substrates, by which the indentation or the stepped area produced along the end face can be effectively filled with the sealing agent.

What is claimed is:

1. A method of sealing a gap between first and second objects with a fluid material, the method comprising:

applying a bead of the fluid material adjacent to an end face of the first object; and discharging a stream of compressed gas from a gas ejecting nozzle to impinge upon the bead of the fluid material such that the fluid material is forced into the gap between the first and second objects.

2. The method of claim 1 wherein the gap is formed at a side edge of the first object and the gap is filled with the fluid material.

3. The method of claim 1 wherein the fluid material is a viscous epoxy material.

4. The method of claim 1 wherein the fluid material is a viscous silicon type material.

5. The method of claim 1, wherein the first and second objects are components of an electronic device.

* * * * *